(12) United States Patent
Zona et al.

(10) Patent No.: US 8,422,058 B2
(45) Date of Patent: Apr. 16, 2013

(54) MUTUALISTIC ENGINE CONTROLLER

(75) Inventors: Michael F. Zona, Holley, NY (US); Aaron M. Burry, Ontario, NY (US); Bruce E. Thayer, Spencerport, NY (US); Peter Paul, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 659 days.

(21) Appl. No.: 12/487,756

(22) Filed: Jun. 19, 2009

(65) Prior Publication Data
US 2010/0321719 A1 Dec. 23, 2010

(51) Int. Cl.
*G06F 3/12* (2006.01)
*G06F 3/00* (2006.01)
*G06K 15/22* (2006.01)
*G06K 15/02* (2006.01)
*H04N 1/60* (2006.01)

(52) U.S. Cl.
USPC ............. 358/1.15; 358/1.4; 358/1.2; 358/1.9; 710/1

(58) Field of Classification Search .............. 358/1.15, 358/1.4, 1.2, 1.9; 710/1
See application file for complete search history.

(56) References Cited

U.S. PATENT DOCUMENTS

| | | | |
|---|---|---|---|
| 6,032,004 A * | 2/2000 | Mirabella et al. ............... | 399/90 |
| 6,102,508 A | 8/2000 | Cowger | |
| 7,146,112 B2 | 12/2006 | Phipps et al. | |
| 7,224,917 B2 | 5/2007 | Julien et al. | |
| 7,237,771 B2 | 7/2007 | Lang et al. | |
| 7,471,905 B2 * | 12/2008 | Cook ............................... | 399/24 |
| 7,529,491 B2 | 5/2009 | Rommelmann et al. | |
| 7,593,130 B2 * | 9/2009 | Mongeon et al. .............. | 358/1.4 |
| 7,817,292 B2 | 10/2010 | Fujii | |
| 2002/0059479 A1 * | 5/2002 | Hardy et al. ...................... | 710/1 |
| 2002/0078012 A1 * | 6/2002 | Ryan et al. ......................... | 707/1 |
| 2006/0080672 A1 * | 4/2006 | Smith et al. .................... | 719/317 |
| 2008/0257955 A1 | 10/2008 | Adachi | |
| 2010/0289845 A1 * | 11/2010 | Conway et al. ................. | 347/16 |

OTHER PUBLICATIONS

U.S. Appl. No. 12/730,512, filed Jun. 22, 2012, pp. 1-17.
U.S. Appl. No. 12/244,395, filed Oct. 2, 2008, Burry et al.
U.S. Appl. No. 12/730,512 Office Action Communication, Office Action Dated Dec. 14, 2012, pp. 1-17.

* cited by examiner

Primary Examiner — Akwasi M Sarpong
(74) Attorney, Agent, or Firm — Gibb & Riley, LLC

(57) ABSTRACT

A printing device has a printing engine that is at least partially made up of a customer replaceable unit or units. An engine controller is operatively connected to the printing engine. The engine controller uses software to control the operations of the printing engine. A non-volatile memory is operatively connected to the engine controller. The non-volatile memory stores values used by the engine controller to control operations of the printing engine. An adapter card is operatively connected to the non-volatile memory and to the customer replaceable units. The customer replaceable unit has a memory unit and the adapter card reads data from the memory unit. The adapter card uses the data to directly alter values within the non-volatile memory by bypassing the engine controller when communicating with the non-volatile memory. Further, the adapter card alters the non-volatile memory without altering the software used by the engine controller.

13 Claims, 3 Drawing Sheets

MUTUALISTIC ENGINE CONTROLLER

BACKGROUND AND SUMMARY

Embodiments herein generally relate to electrophotographic printers and copiers or reproduction machines, and more particularly, concerns an adapter card that can bypass the print engine controller to directly change values within a printer's non-volatile memory, based on data maintained by customer replaceable units.

Many recent advances in printing focus on better integration of control systems with the hardware and materials to improve run cost and other functionally important topics (FITs). Many of the concepts and proposals being developed require some level of software integration to gain the full run cost or other FIT benefits. While there is some input to the control software for a manufacturer's developed products, for outsourced or acquired products, the "hooks" into the software to implement advanced technology concepts are lacking, and getting outsource vendors to provide the appropriate taps into the machine control is sometimes difficult. Some of these concepts could benefit the current machine population in the field greatly, but would require a costly and nearly unfeasible software upgrade to implement. In such instances, a manufacturer would likely have very little control of the system software, but would want to inject value-add technologies to improve the performance and robustness of these base engines.

This disclosure outlines a method of obtaining the required control "hooks" in an outsourced print controller that enables concepts being developed to improve run cost and other FITs in current and future acquired engines. Most print engines support some form of external updates of their non-volatile memory (NVM)—through a front panel user interface, service interface, TCP/IP connection, etc. By adding a low cost electronic module to the engine that communicates with the customer replaceable unit memory, often through RFID interface, and the machine control unit (MCU), embodiments herein make it possible to affect machine operation solely through adjustment of the machine's non-volatile memory.

Embodiments herein take advantage of the standard interfaces normally provided by the machine control unit to enable implementation of technology concepts without requiring changes to the system software of the engine. In addition, the embodiments herein enable manufacturing to modify machine settings on a cartridge by cartridge basis to enable improvements that are developed during the machine's life cycle, without requiring a service engineer to make any software upgrades or unscheduled maintenance, and without requiring any special hooks within the machine's engine control software.

More specifically, embodiments herein include a printing device that has at least one printing engine that is at least partially made up of a customer replaceable unit or units. At least one engine controller is operatively connected to the printing engine. (As used herein, one item is "operatively connected to" another item when the items are directly connected to one another, connected to one another by wiring or wireless connections, or connected to one another through intermediate devices).

The engine controller uses software to control the operations of the printing engine. At least one non-volatile memory is operatively connected to the engine controller. The non-volatile memory stores values used by the engine controller to control operations of the printing engine.

At least one adapter card is operatively connected to the non-volatile memory and to the customer replaceable units. The adapter card comprises a physically separate device from the engine controller. The adapter card comprises a printed circuit board, some form of logic unit, such as at least one processor or a field programmable gate array (FPGA) mounted on the printed circuit board, wiring within the printed circuit board connected to the processor, and connection terminals on the printed circuit board connected to the wiring. The connection terminals plug into terminals within the printing device, and are therefore operatively connected to the non-volatile memory.

At least one of the customer replaceable units has a memory unit and the adapter card reads data from the memory unit. The non-volatile memory and the memory unit each comprise some form of computer readable storage medium.

The adapter card uses the data from the customer replaceable unit's memory to directly alter values within the non-volatile memory (even if the software used by the engine controller is non-compatible with the data within the memory unit) by bypassing the engine controller when communicating with the non-volatile memory. Further, the adapter card alters the non-volatile memory without altering the software used by the engine controller.

A method embodiment herein supplies the aforementioned printing engine that has the customer replaceable units. The method connects the engine controller to the printing engine and connects the non-volatile memory to the engine controller. The method also connects the adapter card to the non-volatile memory and to the customer replaceable units. With the method, the adapter card reads data from the memory unit within one of the customer replaceable units, and the adapter card uses the data to directly alter values within the non-volatile memory by bypassing the engine controller when communicating with the non-volatile memory.

The method further comprises manufacturing the adapter card in a process comprising providing the printed circuit board, mounting at least one logic unit on the printed circuit board, connecting the wiring within the printed circuit board to the processor; and connecting the connection terminals on the printed circuit board to the wiring. Again, the connection terminals are operatively connected to the non-volatile memory.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

Figure 1:
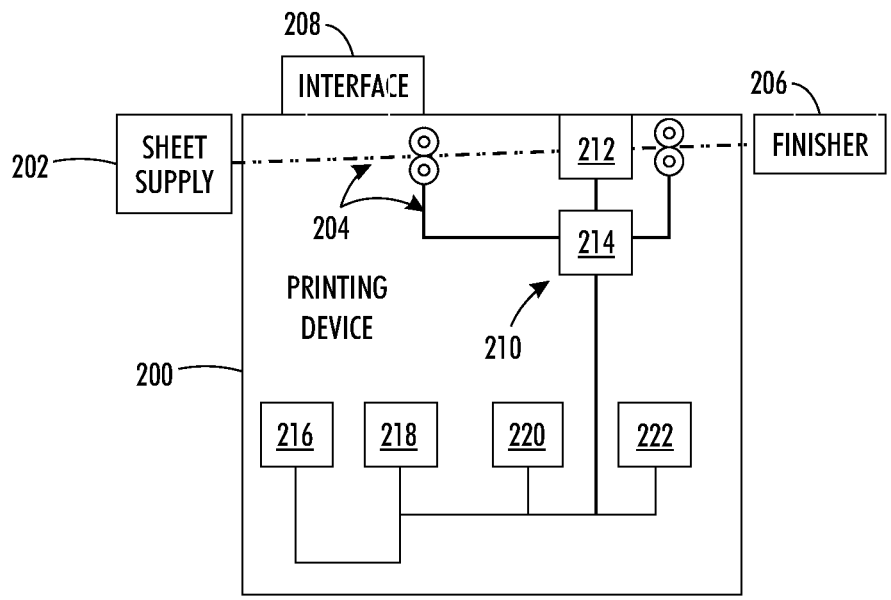
FIG. 1 is a schematic diagram of a printing device according to embodiments herein.

Referring now to FIG. 1, embodiments herein include a printing device 200 that has at least one printing engine 210 that is at least partially made up of customer replaceable units (CRU) 212/214. The customer replaceable units or modules 212/214 can comprise, for example, photoreceptors, fusers, drums, rollers, toner cartridges, ink cartridges, etc., and are items that are usually replaced by either a customer or an end user (and do not require the services of a trained service technician). Customer replaceable units are items that are well-known to those ordinarily skilled in the art (for example, see U.S. Pat. Nos. 7,146,112 and 7,529,491, the complete disclosures of which are incorporated herein by reference) and are available from manufacturers such as Xerox Corp., Norwalk Conn., USA. Therefore, a detailed discussion of such customer replaceable units is not included herein so as to focus the reader on the salient features of the disclosed embodiments.

At least one engine controller 216 is operatively connected to the printing engine 210. The engine controller 216 uses software, potentially stored in a memory device (magnetic storage medium, etc.) 222, to control the operations of the printing engine 210. Engine controllers and printing devices are items that are well-known to those ordinarily skilled in the art (for example, see U.S. Pat. No. 7,237,771 the complete disclosure of which is incorporated herein by reference) and are available from manufacturers such as Xerox Corp., Norwalk Conn., USA. Therefore, a detailed discussion of such items is not included herein so as to focus the reader on the salient features of the disclosed embodiments.

In addition, the printing device 200 includes an interface or digital front end (DFE) 208 that can comprise a scanner, a graphic user interface, network connections, TCP/IP serial communication, front panel keyboard wedge, or direct connection, and/or other input output connections. Incoming print jobs are sent to the engine via the interface 208. The interface 208 raster image processes (RIPS) the job and sends it to the engine controller 216 to be imaged onto the photoreceptor (212/214), transferred, and finally fused to the sheets of media (substrate). The printing device 200 draws sheets of media from the sheet supply 202 and utilizes a paper path 204 to feed the sheets through the printing engine 210. A finisher unit 206 can process the sheets after they have been printed by stapling, binding, folding, etc., the sheets.

At least one non-volatile memory 218 is operatively connected to the engine controller 216. The non-volatile memory 218 stores values used by the engine controller 216 to control operations of the printing engine 210. At least one adapter card 220 is operatively connected to the non-volatile memory 218 and to the customer replaceable units 212/214. The lines between the units shown in FIG. 1 can comprise wires or wireless connections, such as radio frequency identification (FRID) wireless communication connections. The adapter card 220 is shown in greater detail in FIG. 2 and comprises a physically separate device from the engine controller 216.

Figure 2:
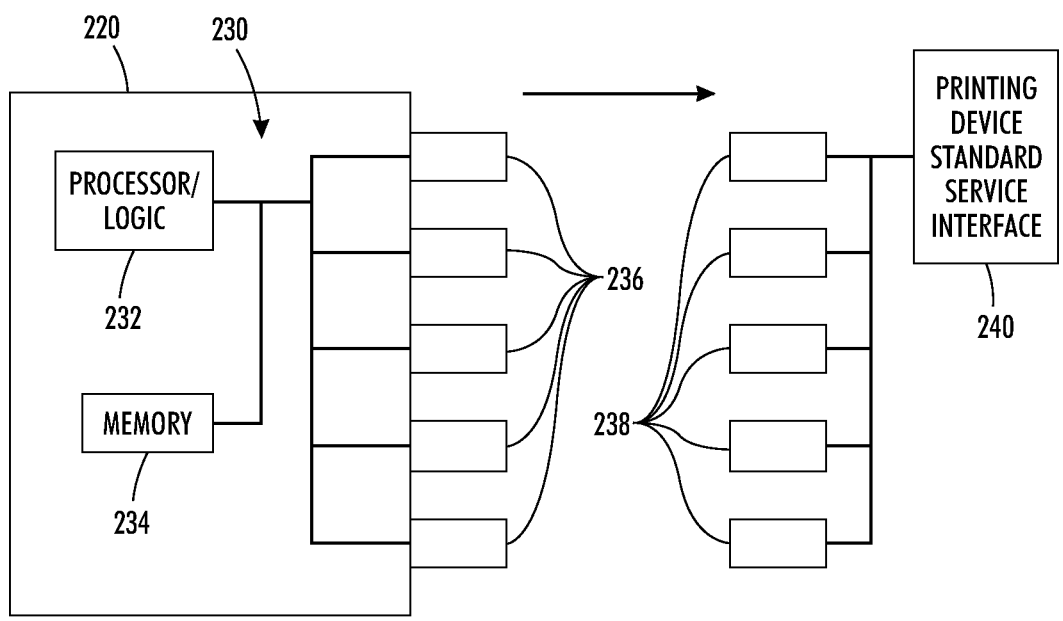
FIG. 2 is a schematic diagram of an adapter card according to embodiments herein.

Referring to FIG. 2, the adapter card 220 comprises a separate printed circuit board 230 and at least one processor or logic unit 232 mounted on the printed circuit board 230. A memory unit 234 can also be attached to the printed circuit board 230. Wiring is present within the printed circuit board 230 and is connected to the processor 232 and memory 234. Connection terminals 236 on the printed circuit board 230 are connected to the wiring. As would be understood by those ordinarily skilled in the art, other items such as electrostatic discharge circuitry, various capacitors, resistors, etc., would be included within the adapter card 220; however, such structures are intentionally not illustrated in FIG. 2 in order to simplify the drawings.

The connection terminals 236 connect to corresponding connection terminals 238 of the printing device. The printing device connection terminals 238 are connected to the wiring within the printing device 200. Therefore, the adapter card connection terminals 236 are operatively (indirectly) or directly connected to the non-volatile memory 218 and to the customer replaceable units 212/214.

For example, the printing device connection terminals 238 can be wired into the printing device standard service interface 240 that service engineers connect to when reprogramming the values within the non-volatile memory 218. This allows the adapter card 220 to perform the same activities that could be performed by a service engineer, without requiring a service call. The printing device standard service interface 240 could be, in some embodiments, part of the interface 208 illustrated in FIG. 1, or could be a separate structure.

Alternatively, the printing device connection terminals 238 could be directly wired to the non-volatile memory 218 or could be wired to the any other access point or controller that would allow access to the non-volatile memory 218. Further, the printing device connection terminals 238 are connected to the systems within the printing device 200 that read and maintain the data from the customer replaceable unit's memory 212/214. (For details regarding such systems, see the previously mentioned U.S. Pat. No. 7,146,112).

At least one of the customer replaceable units (CRU) 212/214 has a memory unit (CRUM) that stores information and data used by the machine (date produced, origin, country, etc.) and information that is recorded from the machine (machine print counts, paper sizes printed, pixel counts, etc.) that help the printing engine 210 operate properly, often through an RFID interface. The non-volatile memory 218, the memory units within the customer replaceable units 212/214, and the memory unit 234 can comprise any type of computer readable storage medium including a non-volatile memory, random access memory, a permanent storage medium (magnetic, optical, etc.).

The data maintained within the memory of the customer replaceable units 212/214 changes as the design of the customer replaceable units 212/214 are updated and improved over time. This data and information may be different than the information that was available when the printing device 200 was originally manufactured. Therefore, when a customer replaces one of the customer replaceable units 212/214, the customer not only replaces a consumed or worn out component, the customer also updates the information provided to the printing device 200 to help it continue to operate at peak performance and fully utilized the design updates and advances that may have been made to the customer replaceable units 212/214.

Some of the updates included within the memory of the customer replaceable units 212/214 can require changes to the non-volatile memory 218; however, if the customer replaceable units 212/214 are manufactured by a different organization than the manufacturer of the printing device 200 and/or the manufacturer of the engine controller 216, the information within the customer replaceable unit may be in an incompatible format for the controller 216 to utilize. Therefore, the adapter card 220 is configured to bypass the controller 216 and directly alter the non-volatile memory 218. This allows the adapter card 220 to alter the non-volatile memory 218 without having to alter the software used by the engine controller 216 and without requiring the expertise of a trained service engineer.

The adapter card 220 reads data from the memory unit that resides with the customer replaceable unit. The adapter card 220 uses the data to directly alter values within the non-volatile memory 218 (even if the software used by the engine controller 216 is non-compatible with the data within the memory unit) by bypassing the engine controller 216 when communicating with the non-volatile memory 218.

Figure 3:
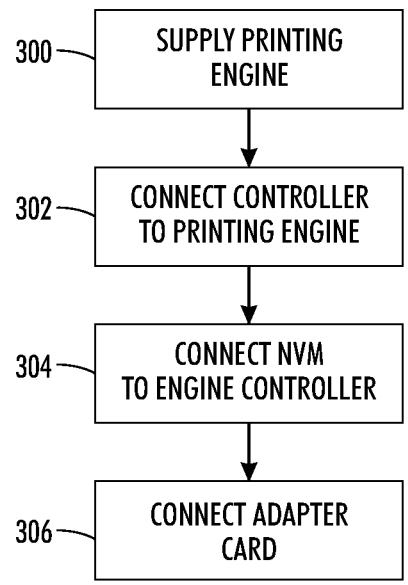
FIG. 3 is a flow diagram illustrating method embodiments herein.

As shown in flowchart form in FIG. 3, one exemplary manufacturing method embodiment herein begins in item 300 by supplying the aforementioned printing engine 210 that has the customer replaceable units 212/214. In item 302, the method connects the engine controller 216 to the printing engine 210 and, in item 304, connects the non-volatile memory 218 to the engine controller 216. In item 306, the method also connects the adapter card 220 to the non-volatile memory 218 and to the customer replaceable units 212/214.

Figure 4:
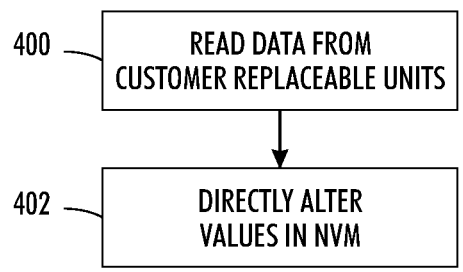
FIG. 4 is a flow diagram illustrating method embodiments herein.

As shown in flowchart form in FIG. 4, in an operational example, according to one method herein (in item 400) the adapter card 220 reads data from the memory unit within one of the customer replaceable units 212/214, and in item 402 the adapter card 220 uses the data to directly alter values within the non-volatile memory 218 by bypassing the engine controller 216 when communicating with the non-volatile memory 218.

Figure 5:
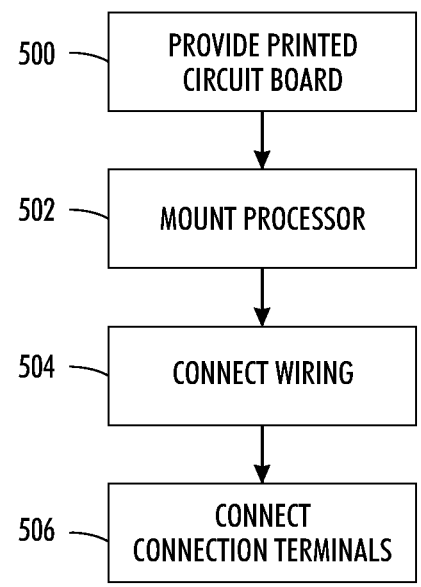
FIG. 5 is a flow diagram illustrating method embodiments herein.

FIG. 5 illustrates, in flowchart form, that the method embodiments herein further comprise a manufacturing method for the adapter card 220. This process comprising providing the printed circuit board 230 (item 500); mounting at least one processor 232 on the printed circuit board 230 (item 502); connecting the wiring within the printed circuit board 230 to the processor 232 (item 504); and connecting the connection terminals 236 on the printed circuit board 230 to the wiring (item 506).

The adapter card 220 is an inexpensive add-on board that provides a communication vehicle between the engine controller and the customer replaceable unit memory. The adapter card 220 reads a set of memory locations on the CRUM, often through an RFID interface, and modifies non-volatile memory locations within the engine controller (potentially via TCP/IP, serial communication, front panel keyboard wedge, or direct connection) based on this information. Typically, the engine controller has the capability, as delivered from its manufacturer to modify non-volatile memory 218 by these protocols to enable the portable workstation software (PWS) that is used by the service engineers. The adapter card 220 provides similar capability, without service engineer intervention or contact with the external world (i.e. network upgrade) based solely on input from the CRU memory. When a cartridge 212/214 is installed into the machine, the adapter card 220 reads pre-defined memory locations that contain a non-volatile memory 218 location to modify and the new value to write to that location. The adapter card 220 then modifies values that reside in the non-volatile memory 218 within the engine controller so that the controller can modify the control algorithms based on the new non-volatile memory settings. This process is repeated every time a new CRU is installed which provides a method of modifying the process control settings on a cartridge by cartridge basis without any service engineer intervention.

Such automated processing enables deployment of new technologies to the field in the CRUs with no upgrade of the system software required. In addition, there is no special requirement on the system software to support this upgraded functionality and/or technology sets within the CRUs. Most engines already support adjustment of the non-volatile memory settings through at least one interface with the external world. The present invention places a smart box (the adapter card 220) within the printing device to enable such non-volatile memory upgrades without any required contact with the external world. The system software does not need to be changed to enable the adapter card 220.

The adapter card 220 module can be added before the machine is delivered to the customer or even after delivery, as a field upgrade kit, providing a method to modify control settings and enable integration of hardware and materials changes that occur over the machine's life without any service engineer intervention. The adapter card also allows many different configurations of cartridge hardware to exist in the field at the same time, since each cartridge modifies machine non-volatile memory 218 regardless of what software version is loaded on the machine. The following is an example of the impact the adapter card 220.

One hardware modification that can enable a reduction in run cost is the development of an overcoated photoreceptor. The photoreceptor has a 2-6 micrometer coating as the top layer which prevents wear and scratches that occur during the contact charging process in these machines. Typical photoreceptor wear for current devices is around 30 nanometers per thousand cycles, while the overcoat has shown to have 2-3 nanometers per thousand cycles. This enables a 3-4× improvement in the life of the customer replaceable units for the color stations. The machines in the field are designed to adjust the setpoints based on the thickness of the photoreceptor transport layer. The manufacturer develops an algorithm for these setpoint adjustments based on the wear rate of the photoreceptor that ships with the machine. In order to use a cartridge with the new overcoated photoreceptor, machine non-volatile memories need to be modified to account for the much lower wear rate of the overcoat. Prior to embodiments herein, this would have been done by a service call to modify the non-volatile memory 218 or download new software to the machine. This non-volatile memory change (service call) would be needed every time the customer switched from one type of photoreceptor to the other, making introduction of the over-coated photoreceptor a logistical nightmare to implement in the field.

However, with the adapter card 220 module installed in the machine, the adapter card 220 uses the CRUM, often through an RFID interface, in the replaceable photoreceptor unit to determine which photoreceptor resides in that particular cartridge. The CRUM contains the non-volatile memory locations and the new non-volatile memory values, which the adapter card 220 reads, often through an RFID interface, and makes the required modifications to the machines non-volatile memory 218 to accommodate that particular photoreceptor device. This is done using the current TCP/IP, front panel keyboard wedge, direct connection, or serial port 240 that already exists on most engine controllers. In this case, the non-volatile memory locations that contain the coefficients for the setpoints that change based on photoreceptor wear are modified to provide the correct adjustments for the over-coated device. The adapter card 220 is used to determine which photoreceptor is in the cartridge and modifies the machine engine controller accordingly, every time the customer installs a new cartridge. This enables multiple cartridge configurations to exist, simultaneously, in the field. While the photoreceptor was used in this example, the concept can be used for any subsystem or device in the print engine 200.

The adapter card 220 enables hands-free modification of the machine controller, on a cartridge-by-cartridge basis, to allow for run cost or customer satisfaction improvements that occur over the product's lifetime. This allows the needed "hooks" in the machine architecture that outsourcing manufacturers do not enable when the machine is launched and provides a method of implementing improvements without costly field upgrades for each improvement initiative.

The embodiments herein enable the seamless deployment of value-add technologies into print engines for which one does not have direct control over the system software. Automated management of the non-volatile memory settings based on the CRUM parameters enables non-volatile memory adjustment on a per-cartridge basis (thereby allowing cartridges of mixed technologies to be in the field at any given time without issue). While non-volatile memory adjustments could be made using an external interface, a technical representative, service engineer, or remote connection directly to the machine, these other methods do not provide the easy, automated capability to immediately adjust parameters as needed based on the specific device (and its CRUM) that is installed into the machine. Additionally, these other options all add to the post sale service cost of the print engine.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The word "printer" or "image output terminal" as used herein encompasses any apparatus, such as a digital copier, bookmaking machine, facsimile machine, multi-function machine, etc. which performs a print outputting function for any purpose. The details of printers, printing engines, etc. are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrophotographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein should not be implied or imported from any above example as limitations to any particular order, number, position, size, shape, angle, color, or material.

What is claimed is:

1. A printing device comprising:
   at least one printing engine comprising customer replaceable units;
   at least one engine controller operatively connected to said printing engine, said engine controller using software to control operations of said printing engine;
   at least one non-volatile memory operatively connected to said engine controller, said non-volatile memory storing values used by said engine controller to control operations of said printing engine; and
   at least one adapter card operatively connected to said non-volatile memory and to said customer replaceable units,
   at least one of said customer replaceable units comprising a memory unit,
   said adapter card reading data from said memory unit within one of said customer replaceable units,
   said adapter card using said data to alter values within said non-volatile memory by bypassing said engine controller when communicating with said non-volatile memory, and
   said adapter card comprising:
   a physically separate device from said engine controller;
   a printed circuit board;
   at least one logic unit mounted on said printed circuit board;
   wiring within said printed circuit board connected to said logic unit; and
   connection terminals on said printed circuit board connected to said wiring, said connection terminals being operatively connected to said non-volatile memory.

2. The printing device according to claim 1, wherein said adapter card is connected to said non-volatile memory through one of the following interfaces:
   TCP/IP based web server interface;
   front panel keyboard wedge interface;
   service interface; and
   direct hardwired connection.

3. The printing device according to claim 1, wherein said adapter card is connected to said customer replaceable units through an RFID interface.

4. A printing device comprising:
   at least one printing engine comprising customer replaceable units;
   at least one engine controller operatively connected to said printing engine;
   software on said engine controller for adjusting the operation of said print engine;
   at least one non-volatile memory operatively connected to said engine controller, said non-volatile memory storing values used by said engine controller to control operations of said printing engine; and
   at least one adapter card operatively connected to said non-volatile memory and to said customer replaceable units,
   at least one of said customer replaceable units comprising a memory unit,
   said adapter card reading data from said memory unit within one of said customer replaceable units,
   said adapter card using said data to directly alter values within said non-volatile memory by bypassing said engine controller when communicating with said non-volatile memory and without altering said software used by said engine controller, and
   said adapter card comprising:
   a physically separate device from said engine controller;
   a printed circuit board;
   at least one logic unit mounted on said printed circuit board;
   wiring within said printed circuit board connected to said logic unit; and
   connection terminals on said printed circuit board connected to said wiring, said connection terminals being operatively connected to said non-volatile memory.

5. The printing device according to claim 4, wherein said adapter card is connected to said non-volatile memory through one of the following interfaces:
   TCP/IP based web server interface;
   front panel keyboard wedge interface;
   service interface; and
   direct hardwired connection.

6. The printing device according to claim 4, wherein said adapter card is connected to said customer replaceable units through an RFID interface.

7. An adapter card for use with a printing device having at least one printing engine comprising customer replaceable units, at least one engine controller operatively connected to said printing engine using software, and at least one non-volatile memory operatively connected to said engine controller, said non-volatile memory storing values used by said engine controller to control operations of said printing engine, said adapter card comprising:
a printed circuit board;
at least one logic unit mounted on said printed circuit board;
wiring within said printed circuit board connected to said logic unit; and
connection terminals on said printed circuit board connected to said wiring,
said connection terminals being operatively connected to said non-volatile memory,
said adapter card being operatively connected to said non-volatile memory and to said customer replaceable units,
at least one of said customer replaceable units comprising a memory unit,
said adapter card reading data from said memory unit within one of said customer replaceable units,
said adapter card using said data to directly alter values within said non-volatile memory by bypassing said engine controller when communicating with said non-volatile memory, and
said adapter card comprising a physically separate device from said engine controller.

8. The adapter card according to claim 7, said adapter card altering values within said non-volatile memory without altering said software used by said engine controller.

9. The printing device according to claim 7, wherein said adapter card is connected to said non-volatile memory through one of the following interfaces:
TCP/IP based web server interface;
front panel keyboard wedge interface;
service interface; and
direct hardwired connection.

10. The printing device according to claim 7, wherein said adapter card is connected to said customer replaceable units through an RFID interface.

11. A method comprising:
supplying at least one printing engine comprising customer replaceable units;
connecting at least one engine controller to said printing engine, said engine controller using software to control operations of said printing engine;
connecting at least one non-volatile memory to said engine controller, said non-volatile memory storing values used by said engine controller to control operations of said printing engine; and
connecting at least one adapter card to said non-volatile memory and to said customer replaceable units,
at least one of said customer replaceable units comprising a memory unit,
said adapter card reading data from said memory unit within one of said customer replaceable units,
said adapter card using said data to directly alter values within said non-volatile memory by bypassing said engine controller when communicating with said non-volatile memory, and
said adapter card comprising:
a physically separate device from said engine controller;
a printed circuit board;
at least one logic unit mounted on said printed circuit board;
wiring within said printed circuit board connected to said logic unit; and
connection terminals on said printed circuit board connected to said wiring, said connection terminals being operatively connected to said non-volatile memory.

12. The method according to claim 11, said software used by said engine controller being non-compatible with said data within said memory unit.

13. The method according to claim 11, said non-volatile memory and said memory unit each comprising a computer readable storage medium.

* * * * *